(12) United States Patent
Nilsen

(10) Patent No.: US 7,008,139 B2
(45) Date of Patent: Mar. 7, 2006

(54) OIL BOOM AND USE THEREOF

(75) Inventor: Dag Nilsen, Tromsø (NO)

(73) Assignee: NOFI Tromso AS, Kvaloysletta (NO)

( * ) Notice: Subject to any disclaimer, the term of this patent is extended or adjusted under 35 U.S.C. 154(b) by 0 days.

(21) Appl. No.: 10/531,213

(22) PCT Filed: Oct. 13, 2003

(86) PCT No.: PCT/NO03/00341

§ 371 (c)(1),
(2), (4) Date: May 12, 2005

(87) PCT Pub. No.: WO2004/035937

PCT Pub. Date: Apr. 29, 2004

(65) Prior Publication Data
US 2005/0260037 A1    Nov. 24, 2005

(30) Foreign Application Priority Data
Oct. 18, 2002    (NO) ............................. 20025014

(51) Int. Cl.
*E02B 15/04* (2006.01)
(52) U.S. Cl. ...................... 405/63; 405/60; 210/242.3; 210/242.1
(58) Field of Classification Search ............. 405/63, 405/60, 66, 70, 71, 72; 210/242.3, 242.1
See application file for complete search history.

(56) References Cited

U.S. PATENT DOCUMENTS

| 3,579,994 A | | 5/1971 | Preus et al. | |
|---|---|---|---|---|
| 3,688,506 A | * | 9/1972 | Marcocchio et al. | 405/63 |
| 3,771,662 A | * | 11/1973 | Muramatsu et al. | 210/242.3 |
| 3,922,862 A | | 12/1975 | Vidilles | |
| 4,211,659 A | * | 7/1980 | Nyfeldt et al. | 210/242.3 |
| 4,388,188 A | * | 6/1983 | Morris | 405/72 |
| 6,517,726 B1 | * | 2/2003 | Allen et al. | 210/749 |
| 6,881,335 B1 | * | 4/2005 | Nilsen | 210/242.3 |

FOREIGN PATENT DOCUMENTS

| FR | 2 453 238 | 10/1980 |
|---|---|---|
| GB | 1400766 | 7/1975 |

* cited by examiner

*Primary Examiner*—Frederick L. Lagman
(74) *Attorney, Agent, or Firm*—Darby & Darby

(57) ABSTRACT

A boom (1A) is described, especially for containing oil spills and/or other similar pollution at sea, in rivers or on water surfaces, comprising an elongate body consisting of an element having positive buoyancy relative to the surrounding medium, so that a freeboard (5) is provided, and a hanging skirt (6), which boom (1A) is of the type that is usually lowed behind towing vessels or is moored (2) so that the boom (1A) basically forms a U-shape having side arms (4) that define a front opening (10) between them, which arms extend from a rear area or apex (7) when the towing vessels or mooring (2) pulls at the free ends of the arms of the boom (1A) in order to tow the boom (1A), and wherein the skirt (6) is provided with a draught that varies from a minimum size or depth in the area at the boom apex (7) to a maximum size or depth at the free towing ends (15) of the side arms (4) of the boom (1A).

45 Claims, 3 Drawing Sheets

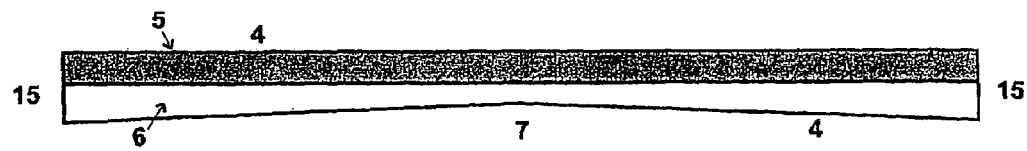
Fig.4
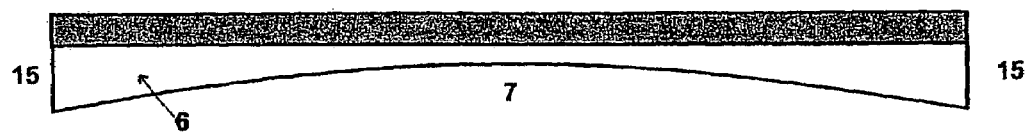
Fig.5
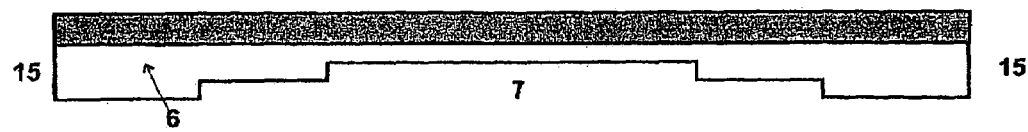
Fig.6
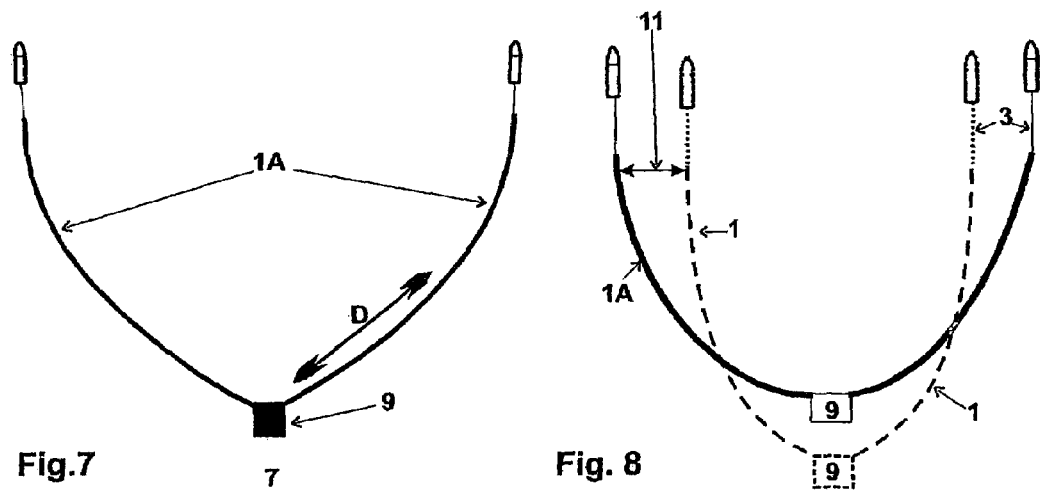
Fig.7    Fig. 8

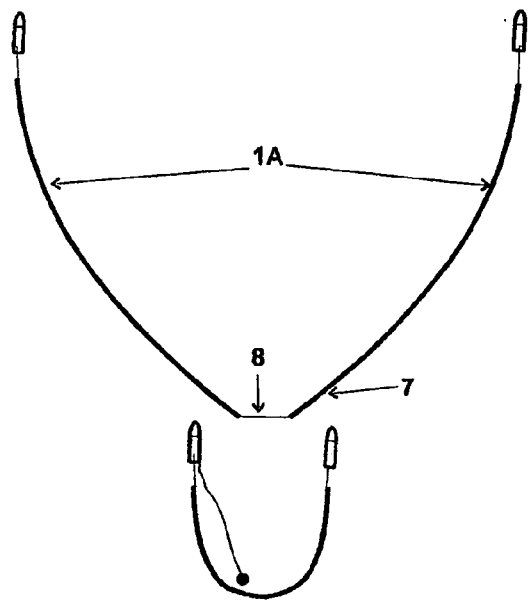
Fig. 9
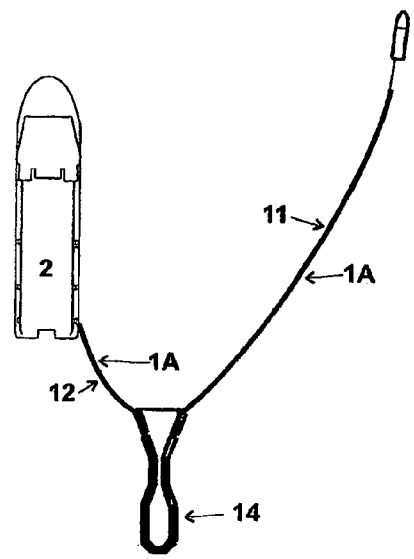
Fig. 10
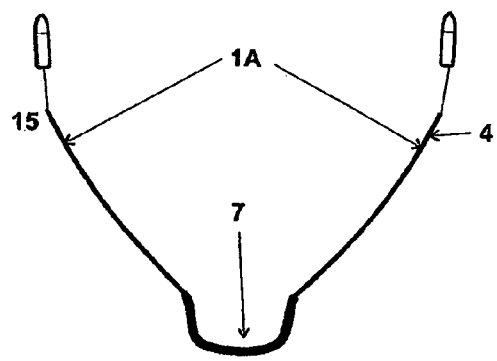
Fig. 11
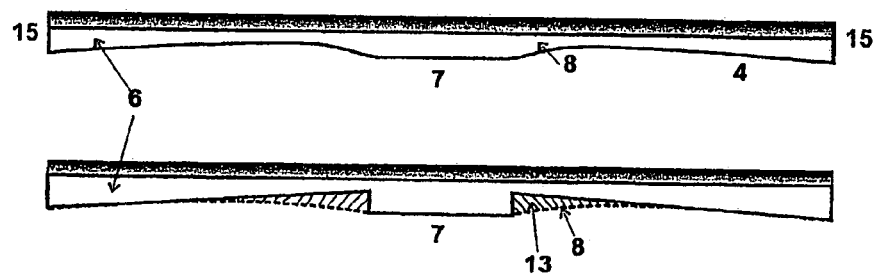

OIL BOOM AND USE THEREOF

The invention relates to an oil boom comprising an elongate body consisting of an element having positive buoyancy relative to a surrounding medium, for example, water or the surface of the sea, and a hanging ski of the type normally towed behind towing vessels so that the boom basically forms a U-shape when the towing vessels pull the free ends of the arms of the U and tow the boom behind them to collect oil spills and/or other undesirable pollution on the surface of the sea or water. When the boom is used in water that moves relative to the bottom, such as rivers or ocean current and the like, the situation will be the same, except that in this case towing vessels can be replaced by fixed mooring, e.g., to the shore or the bottom. Such booms are well known, also in combination with various devices in the form of skimmers or the like that are used to collect and remove the oil from the boom.

Thus, the invention relates to an oil boom as disclosed in the preamble of independent patent claim 1 and a use thereof as disclosed in patent claim 10.

The hanging part of the skirt or the so-called skirt depth of the booms of this type is as a rule uniform or constant/unvarying along the whole extent of the boom. This means that large parts of the arms of the U-boom are pulled or towed substantially parallel with each other so that large parts of the boom arms do little to contribute to a larger front opening.

This front opening is crucial for the area coverage of the boom as regards the containment area. The ratio between the length of the boom and the front opening is called the gap ratio, which is the opening of the boom divided by the length of the boom. The more powerful the boats in relation to the size of the boom and the speed at which it is towed, the greater the possible gap ratio. In use, a gap ratio of 0.4 is typical, i.e., that a boom of 200 meters has a front opening of 80 meters.

Of course, it is conceivable that the towing vessels might not tow in a substantially parallel direction, but in markedly diverging directions, i.e., at an angle outwards from each other in order to increase the front opening. However, a solution of this kind has in practice been found to be almost useless, in particular if the tow is to be carried out at a reasonably acceptable speed. Even if a solution of this kind is chosen, the boom arms will still be parallel at the front, although for a shorter distance.

As additional examples of the prior art reference can be made to U.S. Pat. Nos. 3,579,994 and 3,922,862 and also to GB Patent 1 400 766.

The '994 patent teaches a barrier or blocking device for control of substances in bodies of water comprising a hanging skirt having permanent ballast along its lower edge. A variant of the device is especially designed for shore anchoring and the skirt portions closest to the shore areas, i.e., the anchoring ends, are stepped so that the skirt will be better adapted to the depth of the beach zone.

The '862 patent teaches a boom device designed to be towed for containment of contaminants. One of the features of the device is a hanging skirt having a depth that varies from a maximum at the apex of the boom to a minimum at the towing ends. The patent is especially directed towards details of the design and the varying depth as mentioned above.

The GB patent relates to a floating boom having a hanging ballasted skirt, the depth of which may be varied. The object is to make it easier to tow the boom into place as the depth is reduced during such an operation in order to lessen the towing drag and to enhance manoeuvrability, and subsequently to adjust the depth to the actual area of use.

The object of the invention is in a simple and efficient manner to ensure optimal area coverage for oil booms and the like, which none of the cited documents suggest, teach or indicate. This is achieved with a boom of the type mentioned in the introduction which is characterised by the features disclosed in the characterising clause of independent patent claim 1.

Advantageous embodiments of the invention are disclosed in the dependent patent claims.

The invention will now be described with reference to the drawings, wherein;

FIG. 4 is a side view like that in FIG. 3, but showing both arms;

FIG. 5 is a side view like that in FIG. 4, but with a concave reduction in the depth of the skirt;

FIG. 6 is a side view like that in FIG. 5 but with a stepped variation of the depth of the skirt;

FIG. 7 is a schematic illustration of the boom according to the invention used together with a boom apex device that straightens parts of the boom;

FIG. 8 is a schematic view of the boom according to the invention used together with a skimmer or the like connected at the apex of the boom;

FIG. 9 is a schematic view of the boom according to the invention used as an open lead boom, followed by a conventional boom;

FIG. 10 is a schematic view of the boom according to the invention used as a lead boom with boom arms of different lengths; and FIG. 11 is a schematic illustration of a second embodiment of the skirt of the boom according to the invention, and two side views of such a boom.

Figure 1:
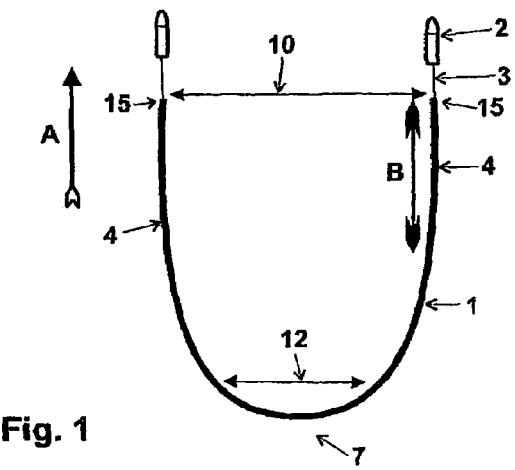
FIG. 1 is a schematic illustration of a conventional oil boom being towed by two towing vessels.

FIG. 1 shows a typical U-boom configuration. The arrow A in the figure indicates the tow direction or relative direction of travel relative to the water when the boom is used in, e.g., rivers or other waters subject to currents. The reference numeral 1 indicates the actual boom and the reference numeral 2 a towing vessel, or anchoring point when the boom is used in a river. The boom 1 is towed or pulled, optionally anchored, using two lines 3 fastened to the free ends 15 of the boom 1 side arms 4 and to two towing vessels 2. The towing vessels 2 are at a suitable distance from each other and move forward substantially in parallel, so that the characteristic U-shape is produced, the boom 1 being made of a flexible material with a conventional flotation body to ensure that it has freeboard, and a hanging skirt, which skirt extends the same depth along the whole boom 1. The U-shaped boom 1 thus forms a front opening 10 defined by the side arms 4 which come together in an apex 7, when the boom is not terminated in a rigid rear portion and/or connected directly to a skimmer or the like. As can be seen from FIG. 1, it is only the front opening 10 and a boom portion 12 that are oriented at 90 degrees to the tow direction, and large parts of the side arms 4 are roughly parallel in the area B and thus do not contribute significantly to the coverage area when containing oil spills or other undesirable pollution.

Figure 2:
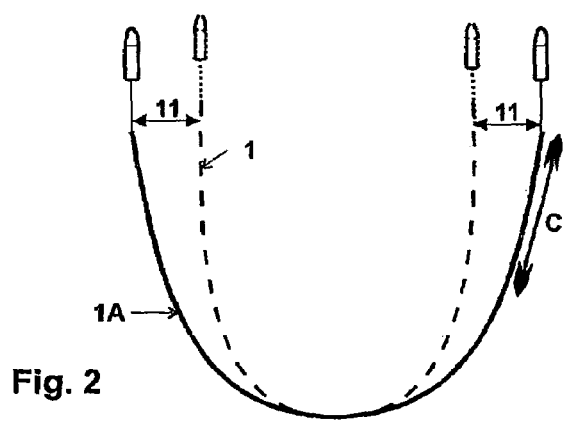
FIG. 2 is a schematic illustration of a boom according to the invention under similar conditions as those shown in FIG. 1, compared with a conventional boom.
Figure 3:
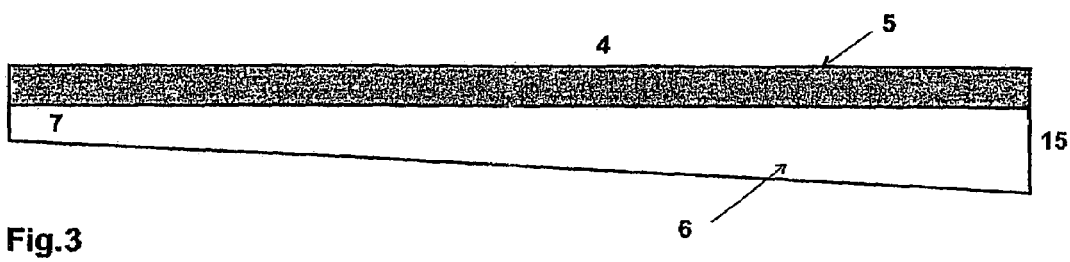
FIG. 3 is a schematic side view of one of the arms of the boom according to the invention.

FIG. 2 is a schematic illustration of a boom 1A according to the invention compared with a conventional boom 1, where the conventional boom 1 is indicated in broken lines. As indicated in FIG. 2, the invention provides an additional front opening 11. This is because in the areas indicated by the letter C the boom is laterally displaced outwards, thus achieving something close to an "otter effect", which per se is a familiar phenomenon for many amateur fishermen. This displacement is achieved in that the boom skirt 6 is made having a skirt length that varies from a minimum in the area at the apex 7 to a maximum at the free ends 15 of the side or boom arms 4, as can be seen from the schematic side view of the boom arm 4 of the boom 1A in FIG. 3.

FIG. 4 is a view of the whole boom 1A according to the invention where both boom arms 4 are connected together at the apex 7 where the depth of the skirt 6 varies linearly from the apex 7 to the free ends 15 of the boom. The skirt depth can also be varied non-linearly in the form of a concave configuration as can be seen from FIG. 5, or in steps as can be seen from FIG. 6. These exemplary embodiments of the design of the depth variation of the skirt are not considered to be limiting for the invention, as the depth can clearly be varied within wide limits without departing from the principle of the invention.

How much the skirt depth or draught is to vary depends on the primary area of use of the boom and the length or size of the boom and primary towing speed. In practice a minimum draught in the range of 0.1 to 0.6 meters and a maximum draught in the range of 0.6 to 2 meters has been found suitable when the oil is to be guided into a connected skimmer or the like which continually guides the oil away from the apex. If the oil is to be held in the apex for later skimming, the minimum depth at the apex can advantageously be increased to more than the given 0.1 to 0.6 meters. These examples of size are not considered to be limiting for the invention, as they can clearly be varied within wide limits without departing from the principle of the invention.

FIG. 7 shows the boom 1A according to the invention wherein at the boom apex 7 there is mounted or attached a device 9 in the form of a local deep skirt, deep skimmer or drag anchor or the like which produces relatively large drag in the water relative to the shallow skirt 6 at the boom apex 7. The part D of the boom 1A which is closest to the boom apex 7 will then extend in a more or less straight line. This allows increased towing speed of the boom without the loss of oil, as the greatest loss of oil under the skirt, so-called entrainment, occurs when the boom is at 90 degrees to the tow direction and this angle is reduced along the whole extent of the boom.

FIG. 8 shows a standard boom 1 and a boom 1A according to the invention in use as lead boom in front of a device 9, the purpose of which is either to further concentrate the oil, store the oil, separate the oil, skim the oil, pump the oil up or combinations thereof. This device 9 may be according to known technology in the form of a vessel with a skimmer at its bow, an inline skimmer, a NOFI VEE SWEEP or the like.

FIG. 9 shows the boom 1A according to the invention which is especially designed for containment at low speeds, where it is to cover a relatively large area by gathering the oil together. Advantageously, the boom can then be combined with a conventional boom such as a standard U-boom 1 that is towed behind the boom 1A which is then provided with a collecting or funnel-like opening at the apex 7 that is held joined together at the bottom of the skirt by means of a chain 8 or the like.

FIG. 10 is a schematic illustration of the boom 1A used together with a skimmer or the like joined or connected directly to the boom apex 7 or a rear portion. The boom 1A in FIG. 10 is dimensioned and especially designed for containment at high speeds, and a so-called NOFI Current or Ocean Buster 14, as described in the Applicant's NO Patent Application No. 20003952, is used. In this case, the port 12 part of the boom 1A is connected to a towing vessel 2 and the port boom 12 is shorter than the starboard boom 11. On each side of the boom apex 7 the boom arm 4 may be varied in length, size and degree of tapering of the skirt for certain configurations, e.g., for operation close to vessels where one arm 12 close to the shipside is much shorter than the arm that runs out towards the other tow boat.

Other modes of use that are not illustrated in the figures are of course also possible. When the boom is used in waters subject to currents, such as a river, where it is desirable to guide the oil in towards the river bank, it is quite possible to do so using just one of the boom arms according to the invention. Since the boom according to the invention will give a better coverage area, it will be possible in this case to manage with fewer booms or a boom that is shorter in length compared with a conventional boom.

There are a number of systems for replacing one of the two tow boats when the boom is used in open seas. The boat may be replaced by an outrigger that holds the free end of the boom out, or by an otterboard-like or trawl door-like device, the purpose of which is to draw one of the boom arms away from the tow boat and thus permit towing of the boom using just one boat. Of course, the boom according to the invention may advantageously be used in combination with these devices, as basically the boom will more easily move outwards into an optimal shape. This also applies in connection with the use of a ropes, for example, in the form of a crow's foot, to control the position of one or more points on the boom from one or both tow boats.

FIG. 11 is a schematic illustration of a second embodiment of the skirt 6 in which a so-called integral apex is formed. In the actual apex area or at the apex 7, the skirt 6 is made having a greater depth before becoming a shallower portion which in turn increases in depth towards the free ends 15 of the side arms 4. This type of boom 1A can at regular intervals in the skirt 6 be fastened directly to the bottom tension member or bottom chain 8, or in some areas it can be made with an open net or netting 13 between the skirt 6 and a bottom chain or bottom tension member 8. The embodiment will impart a more V-shaped boom form to the lead boom 1A during towing as there is a marked tension or drag on the apex 7. At the same time, the part of the boom apex 7 with a deep skirt will to some extent move into a traditional U-boom configuration so that it locally establishes a marked apex 7 where the oil is collected and concentrated prior to skimming, which is some cases may be desirable, for example when used together with certain types of skimmers, or when there is a desire for a long continuous boom which can be coiled up on a boom reel like a standard boom.

Although this is not described in more detail, it goes without saying that the boom 1A may be made so that it can be sectioned. For instance, it may be expedient to split or divide the boom at the apex 7 so as to produce two identical boom halves, each of which can function as independent booms. It may also be possible to carry out further sectioning so that boom lengths can almost be "tailor-made". The sections can in turn be produced in such manner that they can easily be joined together. How this is to be done in practice is a part of the general technical knowledge in the field.

Although the invention above is described by means of exemplary embodiments, these embodiments must only be seen as illustrative and not limiting for the invention as defined in the attached patent claims which are intended to cover all equivalents and the like.

What is claimed is:

1. A boom (1A) for containing pollution on water surfaces, comprising an elongate body with an element having positive buoyancy relative to the surrounding water, so that a freeboard (5) is provided, and a hanging skirt (6), which boom (1A) is of the type that may be towed behind towing vessels (2) so that the boom (1A) basically forms a U-shape having side arms (4) that define a front opening (10) between them, which arms extend from a rear area apex (7) when there is tension on the free ends of the arms of the boom (1A) in order to tow the boom (1A), characterised in that the skirt (6) is provided with a draught that varies from a minimum size in the area at the boom apex (7) to a maximum size at the free towing ends (15) of the side arms (4) of the boom (1A).

2. A boom according to claim 1, characterised in that the boom (1A) is produced in such manner that it can be split at the apex area (7), thereby producing two substantially identical boom halves, each of which can be used separately as a boom.

3. A boom according to claim 1, characterised in that the boom arms (4) have different lengths.

4. A boom according to claim 1, characterised in that the boom arms (4) can be sectioned so that units are provided which can function separately as an independent boom (1A), and may be joined together.

5. A boom according to claim 1, characterised in that the draught of the skirt (6) varies in at least one of a linear, a concave or stepped manner, or a combination of variations.

6. A boom according to claim 1, characterised in that only one of the arms of the boom (1A) extends out from the apex (7) when in use.

7. A boom according to claim 1, characterised in that the skirt (6) is made integral with the boom apex (7), the skirt being made having a greater draught at the apex (7) than in the adjacent portions which are made having a minimum draught before the skirt (6) again increases in draught.

8. A boom according to claim 1, characterised in that the skirt has a minimum draught of about 0.1 meters and a maximum draught of 3 meters.

9. A boom according to claim 1, characterised in that the boom arms (4) or the whole boom (1A) with two boom arms (4) is moored in a current of water.

10. The use of the boom according to claim 1, connected to at least one of an inline skimmer, apex boom or the like at the boom apex (7) for collecting oil spills or the like.

11. A boom according to claim 2, characterised in that the boom arms (4) have different lengths.

12. A boom according to claim 2, characterised in that the boom arms (4) can be sectioned so that units are provided which can function separately as an independent boom (1A) and be joined together.

13. A boom according to claim 3, characterised in that the boom arms (4) can be sectioned so that units are provided which can function separately as an independent boom (1A) and be joined together.

14. A boom according to claim 2, characterised in that the draught of the skirt (6) varies in at least one of a linear, a concave or stepped manner, or a combination of variations.

15. A boom according to claim 3, characterised in that the draught of the skirt (6) varies in at least one of a linear, a concave or stepped manner, or as a combination of variations.

16. A boom according to claim 4, characterised in that the draught of the skirt (6) varies in at least one of a linear, a concave or stepped manner, or as a combination of variations.

17. A boom according to claim 3, characterised in that only one of the arms of the boom (1A) extends out from the apex (7) when in use.

18. A boom according to claim 4, characterised in that only one of the arms of the boom (1A) extends out from the apex (7) when in use.

19. A boom according to claim 5, characterised in that only one of the arms of the boom (1A) extends out from the apex (7) when in use.

20. A boom according to claim 2, characterised in that the skirt (6) is made integral with the boom apex (7), the skirt being made having a greater draught at the apex (7) than in the adjacent portions which are made having a minimum draught before the skirt (6) again increases in draught.

21. A boom according to claim 3, characterised in that the skirt (6) is made integral with the boom apex (7), the skirt being made having a greater draught at the apex (7) than in the adjacent portions which are made having a minimum draught before the skirt (6) again increases in draught.

22. A boom according to claim 4, characterised in that the skirt (6) is made integral with the boom apex (7), the skirt being made having a greater draught at the apex (7) than in the adjacent portions which are made having a minimum draught before the skirt (6) again increases in draught.

23. A boom according to claim 5, characterised in that the skirt (6) is made integral with the boom apex (7), the skirt being made having a greater draught at the apex (7) than in the adjacent portions which are made having a minimum draught before the skirt (6) again increases in draught.

24. A boom according to claim 6, characterised in that the skirt (6) is made integral with the boom apex (7), the skirt being made having a greater draught at the apex (7) than in the adjacent portions which are made having a minimum draught before the skirt (6) again increases in draught.

25. A boom according to claim 2, characterised in that the skirt has a minimum draught of about 0.1 meters and a maximum draught of 3 meters.

26. A boom according to claim 3, characterised in that the skirt has a minimum draught of about 0.1 meters and a maximum draught of 3 meters.

27. A boom according to claim 4, characterised in that the skirt has a minimum draught of about 0.1 meters and a maximum draught of 3 meters.

28. A boom according to claim 5, characterised in that the skirt has a minimum draught of about 0.1 meters and a maximum draught of 3 meters.

29. A boom according to claim 6, characterised in that the skirt has a minimum draught of about 0.1 meters and a maximum draught of 3 meters.

30. A boom according to claim 7, characterised in that the skirt has a minimum draught of about 0.1 meters and a maximum draught of 3 meters.

31. A boom according to claim 2, characterised in that the boom arms (4) or the whole boom (1A) with two boom arms (4) is moored in a current of water.

32. A boom according to claim 3, characterised in that the boom arms (4) or the whole boom (1A) with two boom arms (4) is moored in a current of water.

33. A boom according to claim 4, characterised in that the boom arms (4) or the whole boom (1A) with two boom arms (4) is moored in a current of water.

34. A boom according to claim 5, characterised in that the boom arms (4) or the whole boom (1A) with two boom arms (4) is moored in a current of water.

35. A boom according to claim 6, characterised in that the boom arms (4) or the whole boom (1A) with two boom arms (4) is moored in a current of water.

36. A boom according to claim 7, characterised in that the boom arms (4) or the whole boom (1A) with two boom arms (4) is moored in a current of water.

37. A boom according to claim 8, characterised in that the boom arms (4) or the whole boom (1A) with two boom arms (4) is moored in a current of water.

38. The use of the boom according to claim 2, connected to an inline skimmer, apex boom or the like at the boom apex (7) for collecting oil spills or the like.

39. The use of the boom according to claim 3, connected to at least one of an inline skimmer, apex boom or the like at the boom apex (7) for collecting oil spills or the like.

40. The use of the boom according to claim 4, connected to at least one of an inline skimmer, apex boom or the like at the boom apex (7) for collecting oil spills or the like.

41. The use of the boom according to claim 5, connected to at least one of an inline skimmer, apex boom or the like at the boom apex (7) for collecting oil spills or the like.

42. The use of the boom according to claim 6, connected to at least one of an inline skimmer, apex boom or the like at the boom apex (7) for collecting oil spills or the like.

43. The use of the boom according to claim 7, connected to at least one of an inline skimmer, apex boom or the like at the boom apex (7) for collecting oil spills or the like.

44. The use of the boom according to claim 8, connected to at least one of an inline skimmer, apex boom or the like at the boom apex (7) for collecting oil spills or the like.

45. The use of the boom according to claim 9, connected to at least one of an inline skimmer, apex boom or the like at the boom apex (7) for collecting oil spills or the like.

\* \* \* \* \*